United States Patent
Kim et al.

(10) Patent No.: US 8,976,753 B2
(45) Date of Patent: Mar. 10, 2015

(54) METHOD AND APPARATUS FOR TRANSCEIVING A DOWNLINK CONTROL CHANNEL IN A WIRELESS COMMUNICATION SYSTEM

(75) Inventors: Hakseong Kim, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 13/885,930

(22) PCT Filed: Nov. 17, 2011

(86) PCT No.: PCT/KR2011/008807
§ 371 (c)(1),
(2), (4) Date: May 16, 2013

(87) PCT Pub. No.: WO2012/067448
PCT Pub. Date: May 24, 2012

(65) Prior Publication Data
US 2013/0235839 A1    Sep. 12, 2013

Related U.S. Application Data

(60) Provisional application No. 61/414,885, filed on Nov. 17, 2010, provisional application No. 61/442,282, filed on Feb. 13, 2011.

(51) Int. Cl.
| | | |
|---|---|---|
| *H04W 4/00* | (2009.01) |
| *H04W 72/04* | (2009.01) |
| *H04L 5/00* | (2006.01) |
| *H04W 72/00* | (2009.01) |
| *H04B 7/02* | (2006.01) |
| *H04B 7/04* | (2006.01) |
| *H04B 7/06* | (2006.01) |

(52) U.S. Cl.
CPC ............ *H04W 72/042* (2013.01); *H04L 5/0092* (2013.01); *H04L 5/0007* (2013.01); *H04B 7/024* (2013.01); *H04B 7/0478* (2013.01); *H04B 7/0639* (2013.01)
USPC .......................................... 370/329; 455/450

(58) Field of Classification Search
None
See application file for complete search history.

(56) References Cited

U.S. PATENT DOCUMENTS

| | | | | |
|---|---|---|---|---|
| 2011/0249647 | A1* | 10/2011 | Chen et al. .................... | 370/330 |
| 2011/0273992 | A1* | 11/2011 | Zhang et al. .................. | 370/241 |
| 2012/0082101 | A1* | 4/2012 | Gaal et al. ..................... | 370/329 |

FOREIGN PATENT DOCUMENTS

WO    WO 2010/087646 A2    8/2010

OTHER PUBLICATIONS

Qualcomm Incorporated, "Signaling requirements for transparent MU-MIMO operation," 3GPP TSG-RAN WG1 #62bis, R1-105571, Oct. 11-15, 2010, Xi'an, China, pp. 1-7.

*Primary Examiner* — Clemence Han
(74) *Attorney, Agent, or Firm* — Birch, Stewart, Kolasch & Birch, LLP

(57) ABSTRACT

The present invention relates to a wireless communication system, and more particularly, to a method and apparatus for transceiving a downlink control channel. According to one embodiment of the present invention, a method in which a receiver receives a downlink control channel from a transmitter in a wireless communication system comprises: a step of assuming an overhead of a transmitted reference signal in a data region of a downlink subframe; and a step of decoding the downlink control channel transmitted by the transmitter in the data region on the basis of the assumption of the overhead of the reference signal, wherein the assumption of the overhead of the reference signal is determined on the basis of at least the number of receiving antennas of the receiver.

15 Claims, 15 Drawing Sheets

FIG. 5
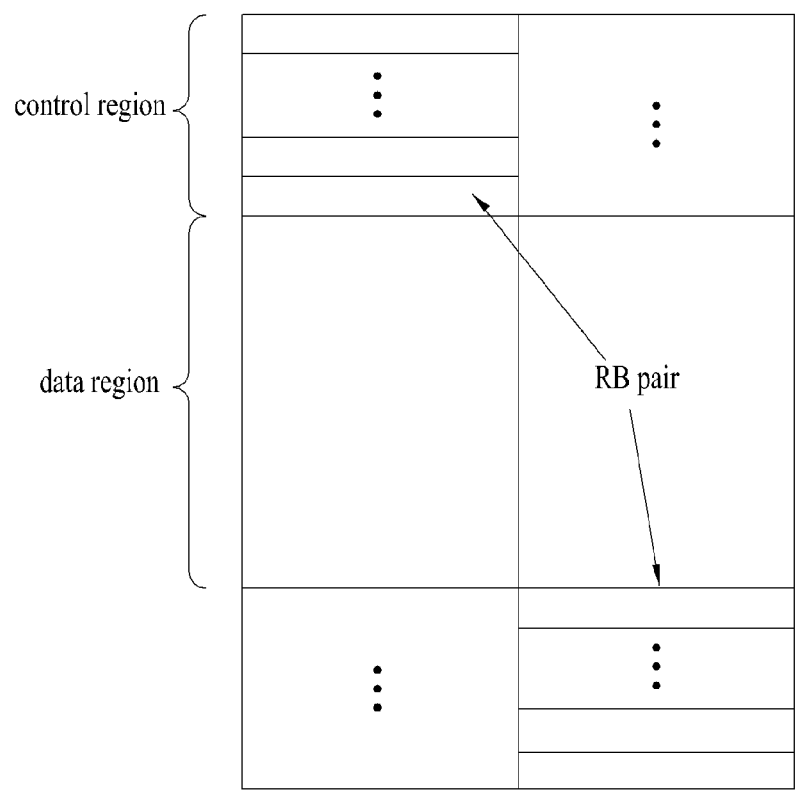
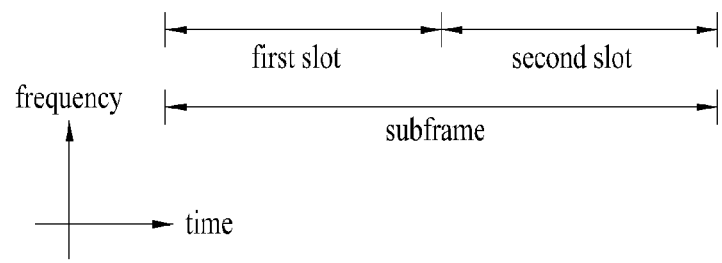

FIG. 6
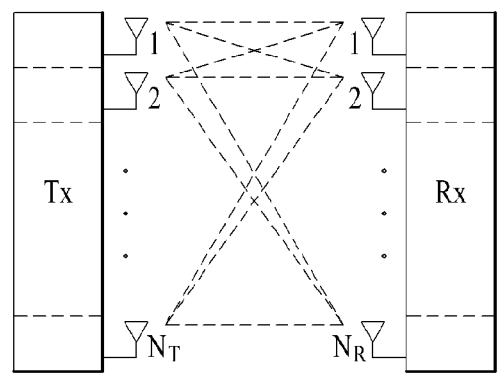
(a)
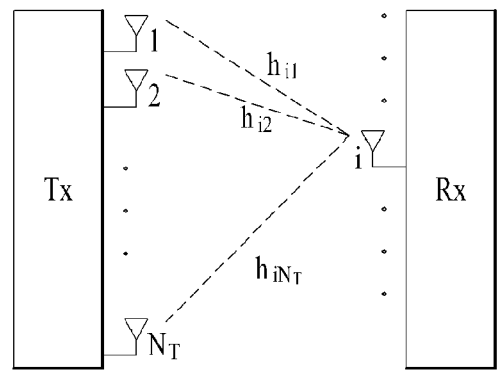
(b)

FIG. 8
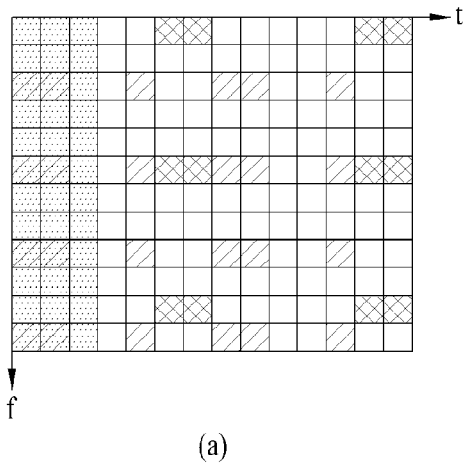
(a)
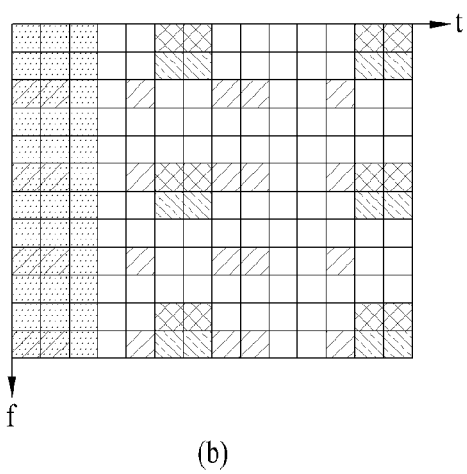
(b)
▨ : Control Channel region
⊠ : DMRS (CDM group 1)
▧ : DMRS (CDM group 2)
▨ : CRS
☐ : Data region

METHOD AND APPARATUS FOR TRANSCEIVING A DOWNLINK CONTROL CHANNEL IN A WIRELESS COMMUNICATION SYSTEM

This application is the National Phase of PCT/KR2011/008807 filed on Nov. 17, 2011, which claims priority under 35 U.S.C. 119(e) to U.S. Provisional Application Nos. 61/414,885 filed on Nov. 17, 2010 and 61/442,282 filed on Feb. 13, 2011, all of which are hereby expressly incorporated by reference into the present application.

TECHNICAL FIELD

The present invention relates to a wireless communication system, and more particularly, to a method and apparatus for transceiving a downlink control channel in a wireless communication system.

BACKGROUND ART

FIG. 1 shows a relay node (RN) 120 and user equipments (UEs) 131 and 132 present within an area of a base station (eNodeB: eNB) 110 in a wireless communication system 100. The relay node 120 forwards data, which is received from the base station 110, to the user equipment 132 within a relay node region. And, the relay node 120 can forward data, which is received from the user equipment 132 within the relay node area, to the base station 110. Such a base station 110 may be represented as a donor base station (donor-eNB). The relay node 120 expands a fast data rate region, enhances a communication quality on a cell edge, and supports an communication offering to a building indoor or an area exceeding a base station service area. Referring to FIG. 1, there are a user equipment (hereinafter named a macro-UE or M-UE) configured to receive a direct service from the base station like the user equipment 131 and a user equipment (hereinafter named a relay-UE or R-UE) configured to receive a service from the relay node 120 like the user equipment 132.

A radio link between a base station and a relay node may be called a backhaul link. A link from a base station to a relay node may be called a backhaul downlink. A link from a relay node to a base station may be called a backhaul uplink. A radio link between a relay node and a user equipment may be called an access link. A link from a relay node to a user equipment may be called an access downlink. And, a link from a user equipment to a relay node may be called an access uplink.

Meanwhile, in MIMO (multiple input multiple output), each transmitting antenna has an independent channel. An MIMO receiving stage estimates a channel for each transmitting antenna of an MIMO transmitting stage and then receives data transmitted from the ach transmitting antenna. Channel estimation means a process for reconstructing a received signal by compensating a signal distortion caused by fading. In this case, the fading means an effect that a strength of a signal rapidly fluctuates due to multipath-time delay in a wireless communication system environment. A reference signal known to both a transmitting entity and a receiving entity is necessary for the channel estimation. The reference signal may be briefly named an RS or a pilot. Moreover, the receiving entity determines channel information on the basis of measurement of a received reference signal and then feeds back the determined channel information to the transmitting entity.

A downlink reference signal is such a pilot signal for coherent demodulation as PDSCH (Physical Downlink Shared CHannel), PCFICH (Physical Control Format Indicator CHannel), PHICH (Physical Hybrid Indicator CHannel), PDCCH (Physical Downlink Control CHannel) and the like.

DISCLOSURE OF THE INVENTION

Technical Task

In a demodulation reference signal (DMRS) for PDSCH demodulation among downlink reference signals, the number (i.e., DMRS overhead) of resource elements (Res) assigned on a radio resource may be changed depending on a channel rank.

Meanwhile, an enhanced wireless communication system considers that a control channel (e.g., PDCCH) is transmitted in a data region of a legacy downlink subframe. For representative example, since it is necessary for a relay node to transmit PDCCH for R-UE in an access downlink in a legacy control region of a backhaul downlink subframe from a base station to the relay node, PDCCH (e.g., R-PDCCH) for the relay node in the backhaul downlink subframe may be transmitted via a legacy downlink data region. Besides, ongoing discussions on control channels (e.g., E-PDCCH, etc.) transmitted in a data region of a legacy downlink subframe are made.

A resource element (RE) mapped by a control channel (e.g., R-PDCCH, E-PDCCH) transmitted in a data region of a downlink subframe should be determined in a manner of avoiding RE mapped by DMRS transmitted in the data region of the downlink subframe. Yet, as mentioned in the foregoing description, the DMRS overhead varies depending on the transmission rank. Hence, in aspect of a receiving stage, if the DMRS overhead is not determined clearly, the control channel (e.g., R-PDCCH, E-PDCCH) transmitted in the data region of the downlink subframe is not correctly decoded.

The technical task of the present invention is to provide a method of performing an operation of transceiving a downlink control channel transmitted in a data region of a downlink subframe efficiently and accurately in consideration of DMRS overhead.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving a downlink control channel, which is received from a transmitter by a receiver in a wireless communication system, according to one embodiment of the present invention may include the steps of assuming an overhead of a reference signal transmitted in a data region of a downlink subframe and decoding the downlink control channel transmitted in the data region by the transmitter based on the assumption for the overhead of the reference signal, wherein the assumption for the overhead of the reference signal is determined at least based on the number of receiving antennas of the receiver.

To further achieve these and other advantages and in accordance with the purpose of the present invention, a downlink control channel receiver, which receives a downlink control channel from a transmitter in a wireless communication system, according to another embodiment of the present invention may include a receiving module configured to receive a downlink signal from the transmitter, a transmitting module configured to transmit an uplink signal to the transmitter, and a processor configured to control the receiver including the receiving module and the transmitting module, the processor assuming an overhead of a reference signal transmitted in a data region of a downlink subframe, the processor configured to decode the downlink control channel transmitted in the data region by the transmitter based on the assumption for the overhead of the reference signal, wherein the assumption for the overhead of the reference signal is determined at least based on the number of receiving antennas of the receiver.

The following items may be applicable in common to the above-mentioned embodiments of the present invention.

Preferably, if the number of the receiving antennas of the receiver is equal to or smaller than N, the reference signal overhead may be assumed as 6 REs/RB/slot (resource elements/resource block/slot). If the number of the receiving antennas of the receiver is greater than the N, the reference signal overhead may be assumed as 12 REs/RB/slot.

Preferably, the assumption for the overhead of the reference signal may be determined based on a smaller one of the number of transmitting antennas of the transmitter and the number of the receiving antennas of the receiver.

More preferably, if the smaller one of the number of the transmitting antennas of the transmitter and the number of the receiving antennas of the receiver is equal to or smaller than N, the reference signal overhead may be assumed as 6 REs/RB/slot. If the smaller one of the number of the transmitting antennas of the transmitter and the number of the receiving antennas of the receiver is greater than the N, the reference signal overhead may be assumed as 12 REs/RB/slot More preferably, the number of the transmitting antennas of the transmitter may be obtained via a system information block (SIB) from the transmitter while the receiver is operating in a UE (user equipment) mode.

More preferably, information on the number of the transmitting antennas of the transmitter may be obtained through higher layer signaling from the transmitter while the receiver is operating in an RN (relay node) mode.

In this case, the higher layer signaling may include a codebookSubsetRestriction field and the receiver may obtain the information on the number of the transmitting antennas of the transmitter from the codebookSubsetRestriction field.

Moreover, a specific bit field among a plurality of bit fields defined in the codebookSubsetRestriction field may be defined as a default bit field, the receiver may obtain the information on the number of the transmitting antennas of the transmitter from a bit value of the default bit field, and the default bit field may be included in the higher layer signaling irrespective of CSI-RS (channel state information-reference signal) configuration.

More preferably, a receiver-specific fake CSI-RS may be configured for the receiver.

Preferably, the number of the receiving antennas of the receiver may be assumed as a predetermined value. More preferably, the predetermined value is 2 and the reference signal overhead may be assumed as 6 REs/RB/slot.

Preferably, information on the number of the receiving antennas of the receiver may be reported to the transmitter during the receiver is operating in a UE (user equipment) mode.

Preferably, the reference signal may include a demodulation reference signal (DMRS) and the downlink control channel may be R-PDCCH (relay-physical downlink control channel) or E-PDCCH (extended-physical downlink control channel).

Preferably, the receiver may include a relay node (relay) and the transmitter may include a donor base station (donor eNodeB).

The above-mentioned general description of the present invention and the following details of the present invention are exemplary and may be provided for the additional description of the invention disclosed in claims.

Advantageous Effects

According to the present invention, a method of performing an operation of transceiving a downlink control channel transmitted in a data region of a downlink subframe efficiently and accurately in consideration of DMRS overhead can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram for a structure of an uplink subframe.

FIG. 6 is a diagram for a configuration of a wireless communication system having multiple antennas.

FIG. 8 is a diagram to describe DMRS pattern.

BEST MODE FOR INVENTION

Figure 1:
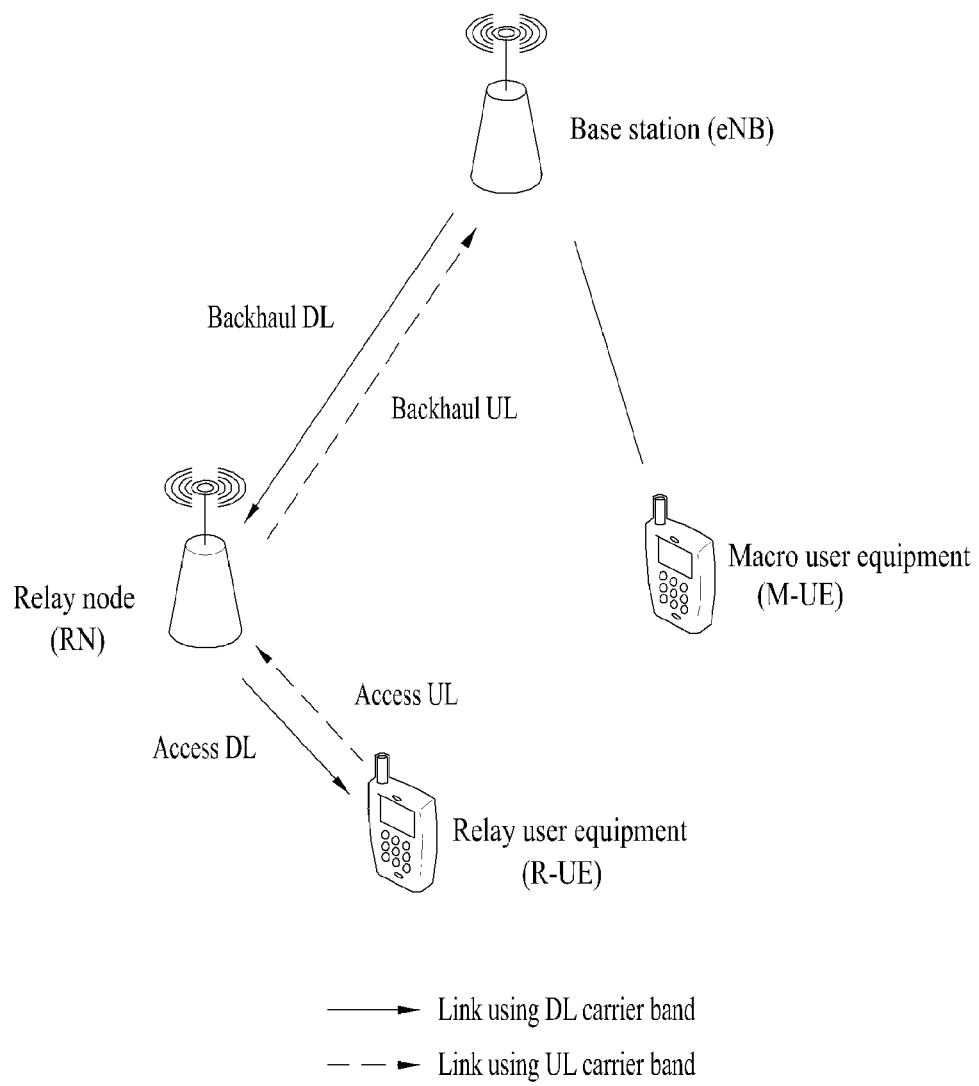
FIG. 1 is a diagram of a wireless communication system including a base station, a relay node and user equipments.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by a higher node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

Figure 2:
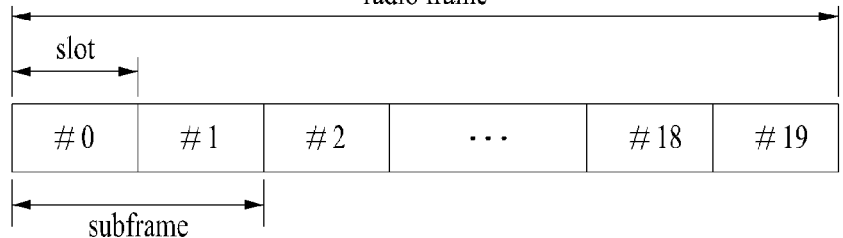
FIG. 2 is a diagram for a structure of a radio frame used in 3GPP LTE system.

FIG. 2 is a diagram for a structure of a radio frame used in 3GPP LTE system. One radio frame includes 10 subframes and one subframe includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA scheme in DL, the OFDM symbol indicates one symbol length (period). And, one symbol may be called SC-FDMA symbol or symbol length in UL. A resource block (RB) is a resource allocation unit and includes a plurality of contiguous subcarriers in one slot. The above-described radio frame structure is just exemplary. Hence, the number of subframes included in one radio frame, the number of slots included in one subframe or the number of OFDM symbols included in one slot may be changed in various ways.

Figure 3:
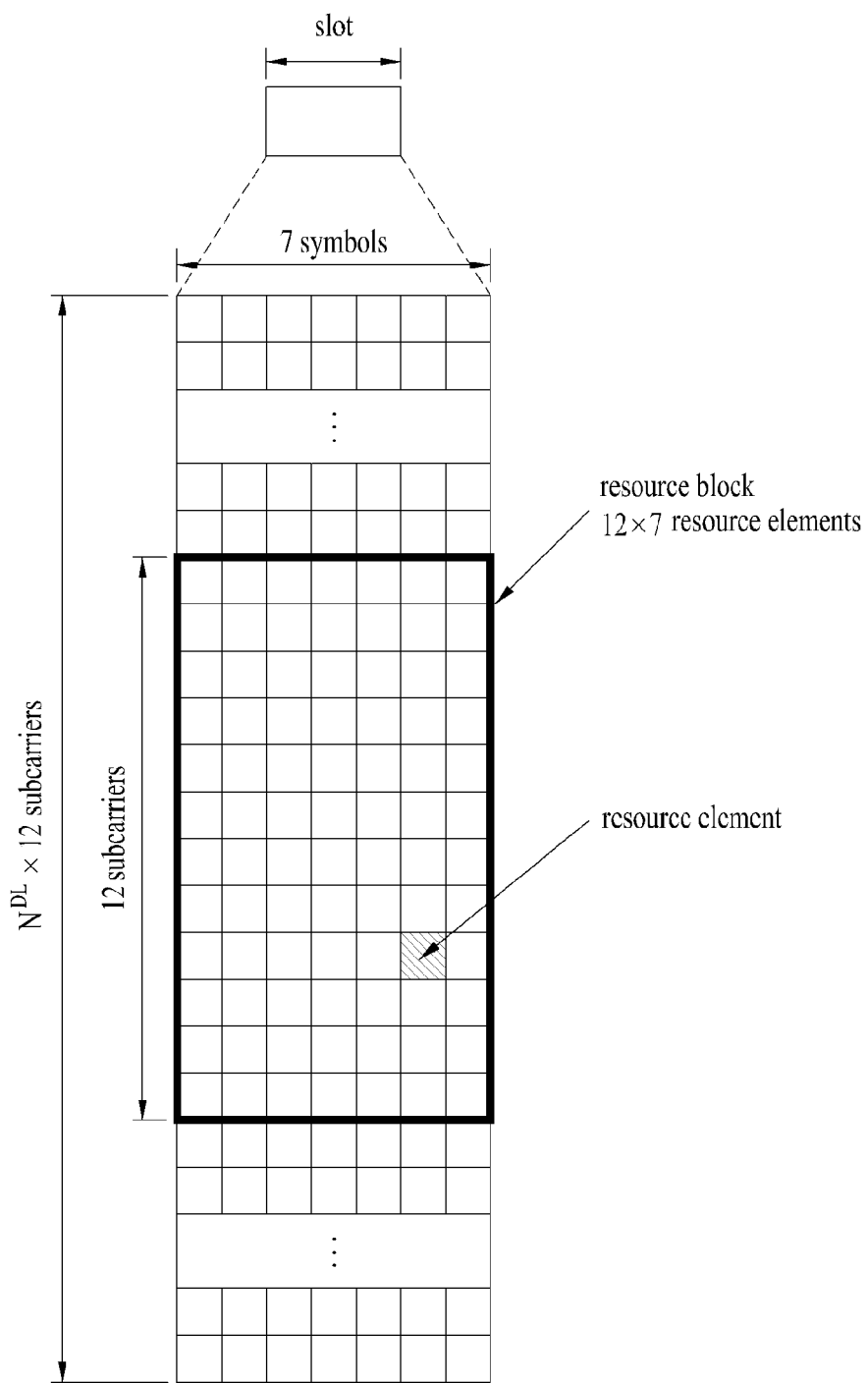
FIG. 3 is a diagram of a resource grid in a downlink slot.

FIG. 3 is a diagram for one example of a resource grid in a downlink (DL) slot. In the drawing, one DL slot may include 7 OFDM symbols in time domain and one resource block (RB) may include 12 subcarriers in frequency domain, by which the present invention may be non-limited. For instance, in case of a normal CP (cyclic prefix), one slot includes 7 OFDM symbols. Yet, in case of an extended CP (extended-CP), one slot may include 6 OFDM symbols. Each element on a resource grid may be called a resource element (RE). One resource block includes 12×7 resource elements. $N^{DL}$ indicates the number of resource blocks included in a DL slot. And, the value of the $N^{DL}$ may depend on a DL transmission bandwidth. A structure of UL slot may be identical to that of the DL slot.

Figure 4:
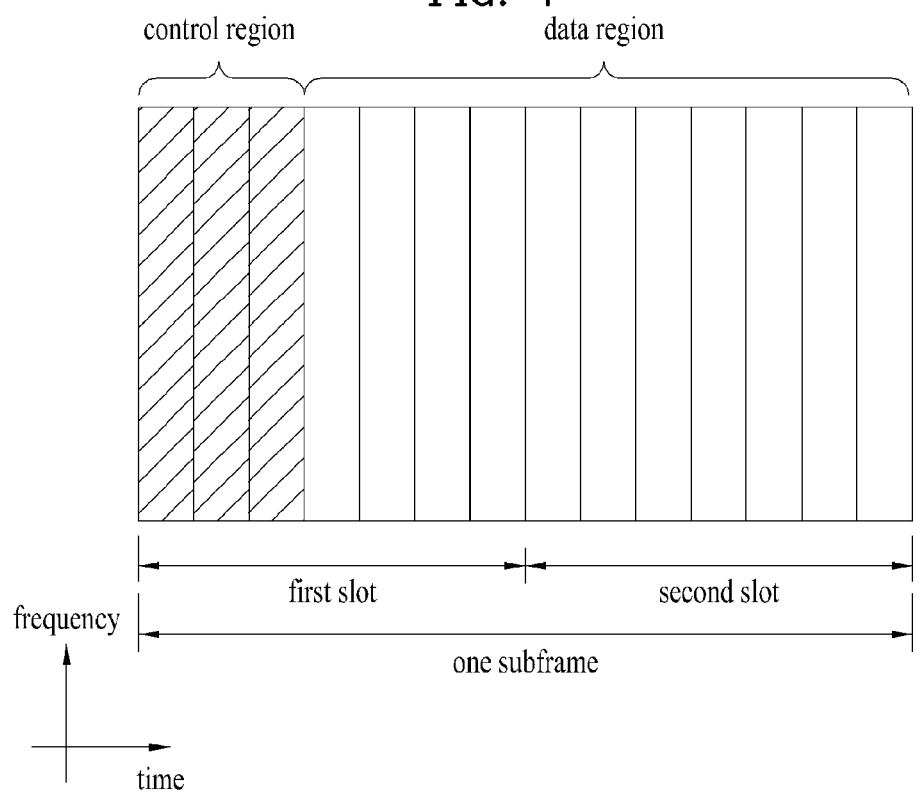
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment can monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

System Information

System information may be divided into a master information block (MIB) and a prescribed number of system information blocks (SIBs).

The MIB defines a most essential physical layer information (e.g., information required for receiving an additional system information, etc.) of a cell.

SIB Type 1 includes an information related to a case of evaluating whether to allow a user equipment to access a cell and defines the scheduling of other system information blocks. SIB Type 2 includes a common channel information and a shared channel information. SIB Type 3 includes a cell reselection information, which mainly relates to a serving cell. SIB Type 4 includes an information (i.e., an information including a cell-specific reselection parameter and a frequency-common cell reselection parameter) on a cell frequency related to a cell reselection and intra-frequency neighbor cells. SIB Type 5 includes an information (i.e., an information including a cell-specific reselection parameter and a frequency-common cell reselection parameter) on other E-UTRA frequencies related to a cell reselection and inter-frequency neighbor cells. SIB Type 6 includes an information (i.e., an information including a cell-specific reselection parameter and a frequency-common cell reselection parameter) on cell reselection related UTRA frequencies and UTRA neighbor cells. SIB Type 7 includes an information (i.e., an information including cell reselection parameters for the respective frequencies) on cell reselection related GERAN frequencies. SIB Type 8 includes an information (i.e., an information including a cell-specific reselection parameter and a frequency-common cell reselection parameter) on cell reselection related CDMA 2000 frequencies and CDMA 2000 neighbor cells. SIB Type 9 includes a home eNB identifier (HNBID). SIB Type 10 includes ETWS (earthquake and tsunami warning service) primary notification. SIB Type 11 includes ETWS secondary notification. SIB Type 12 includes CMAS (commercial mobile alert system) warning notification. And, SIB Type 13 includes an information related to MBMS (multimedia broadcast multicast service).

The MIB is mapped onto BCCH (broadcast control channel) and transmitted on BCH (broadcast channel). On the other hand, all other SI messages are mapped onto BCCH, transmitted on DL-SCH (downlink-shared channel) dynamically, and identified via SI-RNTI. The MIB has a period of 40 ms and uses a fixed scheduling (e.g., the MIB may be fixed to be transmitted in subframe #0 once in every 4 radio frames). The SIB Type 1 has a period of 80 ms and uses a fixed scheduling (e.g., the SIB Type 1 may be fixed to be transmitted in subframe #5 once in every 8 radio frames). Meanwhile, schedulings of other SI messages are flexible and indicated by the SIB Type 1.

A base station can schedule a DL-SCH transmission of a logical channel other than BCCH in the same subframe used for the BCCH. BCCH mapped to DL-SCH may be restricted by a minimum user equipment capability (e.g., a maximum rate, etc.).

A paging message is used to inform user equipments in RRC_IDLE (radio resource control_idle) state and user equipments in RRC_CONNECTED state of the system information change.

In some cases (e.g., handover, etc.), system information may be provided to a user equipment by a dedicated signaling.

Modeling of Multi-Antenna (MIMO) System

FIG. 6 is a diagram for a configuration of a wireless communication system including multiple antennas.

Referring to FIG. 6 (*a*), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_o$ of the case of using a single antenna by a rate increasing rate $R_i$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of these techniques are already adopted as standards for various wireless communications such as 3G mobile communications, a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \qquad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

If a weight matrix W is applied to the transmission power adjusted transmission information vector $\hat{S}$, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented using a vector X as follows.

$$x = \begin{bmatrix} x_1 \\ x_2 \\ \vdots \\ x_i \\ \vdots \\ x_{N_T} \end{bmatrix} \qquad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \qquad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 6 (b) shows a channel to a receiving antenna i from each of $N_T$ transmitting antennas. These channels may be represented as a vector or matrix in a manner of tying the channels b together. Referring to FIG. 6 (b), the channels between the receiving antenna i and the $N_T$ transmitting antennas can be represented as follows.

$$h_i^T = [h_{i1}, h_{i2}, \ldots, h_{iN_T}] \qquad \text{[Formula 7]}$$

Hence, al the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Formula 8]}$$

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T \qquad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} \qquad \text{[Formula 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$\text{Rank}(H) \leq \min(N_T, N_R) \qquad \text{[Formula 11]}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

Reference Signal (RS)

When data is transceived using multiple antennas, it is able to receive a correct signal based on the recognition of each channel status between a transmitting antenna and a receiving antenna. Hence, a separate reference signal should exist for each transmitting antenna. Information for channel estimation and demodulation can be provided by a DL reference signal (CRS and/or DMRS).

The CRS is used to estimate a channel of a physical antenna stage. The CRS is distributed across a whole band as a reference signal that can be received in common by all user equipments (UEs) within a cell. And, the CRS may be usable for the purposes of channel state information (CSI) acquisition and data demodulation.

The DMRS (or a UE-specific reference signal) is a reference signal used for data demodulation. A precoding weight, which is used for a specific user equipment in performing a multi-antenna transmission, is used for the reference signal as it is. Hence, when a user equipment receives the reference signal, the DMRS enables an equivalent channel, which is a combination of a precoding weight transmitted from each transmitting antenna and a transport channel, to be estimated. The legacy 3GPP LTE system (e.g., Release-8) supports a maximum 4-transmitting antenna transmission and defines DMRS for a rank 1 beamforming. The DMRS for the rank 1 beamforming may be represented as a reference signal for an antenna port index 5.

Figure 7:
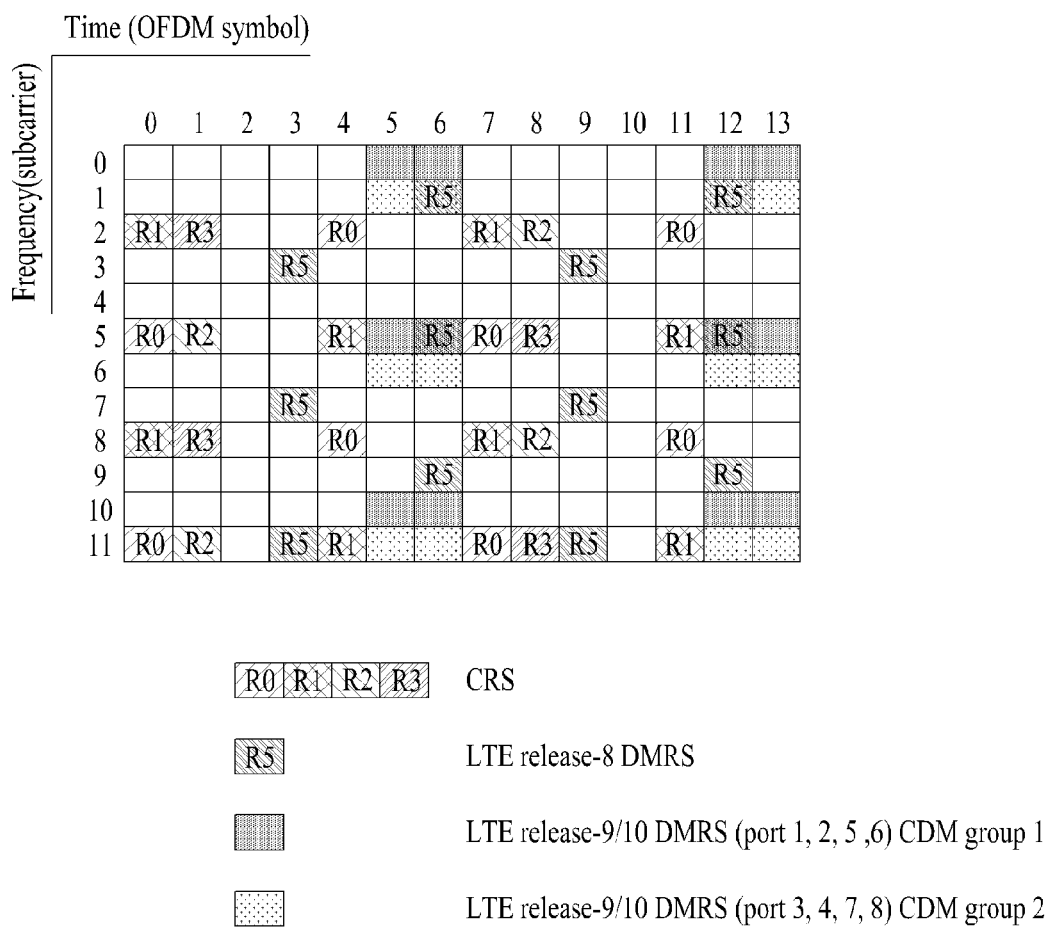
FIG. 7 is a diagram for a downlink reference signal pattern.

FIG. 7 is a diagram of a pattern in which DL CRS and DMRS are mapped on a DL resource block. A DL (downlink) resource block, which is a reference signal mapped unit, can be represented by a unit of '1 subframe on time axis×12 subcarriers on frequency axis'. In particular, one resource block has a length of 14 OFDM symbols on time axis in case of a normal CP or a length of 12 OFDM symbols on time axis in case of an extended CP. FIG. 7 shows a DL resource block in case of a normal CP.

In FIG. 7, resource elements (REs) denoted by R0, R1, R2 and R3 indicate locations of CRSs for antenna indexes 0, 1, 2 and 3, respectively. And, a resource element denoted by R5 indicates a location of DMRS defined by the legacy LTE system (e.g., LTE Release-8).

Meanwhile, in a system of LTE-A (LTE-Advanced) evolved from 3GPP LTE, an extended antenna configuration, MIMO of high order, multi-cell transmission, advanced MU-MIMO and the like are taken into consideration. In order to support efficient reference signal management and advanced transmission scheme, DMRS based data demodulation is taken in to consideration. In particular, aside from DMRS (R5) for rank 1 beamforming defined by the conventional 3GPP LTE (e.g., Release-8), in order to support data transmission via an added antenna, it may be able to define DMRS for at least two layers. This DMRS may be preferably set to exist only in a resource block and layer on which a downlink transmission is scheduled by a base station. The number of antenna port(s) associated with DMRS may be set to one of 1 to 8 and may be indexed as one of antenna ports 7 to 14.

In the following description, one example of DMRS pattern newly introduced into 3GPP LTE Release-9 or LTE-A (i.e., LTE Release 10 or LTE Release next to LTE Release 10) is explained with reference to FIG. 7 and FIG. 8. In the pattern of LTE Release-9/10 DMRS, DMRS used in case of a low rank may be arranged on total 12 REs within one resource block or DMRS used in case of a high rank may be arranged on total 24 REs within one resource block. In particular, the DMRS pattern shown I FIG. 7 shows one example of DMRS pattern for the case of rank 1 to rank 4. And, the DMRS pattern for rank 5 to rank 8 may have the same pattern shown in FIG. 7 but each CDM group can be configured to include 4 layers.

When LTE Release-9/10 DMRS for supporting maximum rank-8 transmission is arranged on a radio resource, DMRSs for respective layers may be arranged in a manner of being multiplexed together. TDM (time division multiplexing) means that DMRSs for at least two layers are arranged on different time resources (e.g., OFDM symbols), respectively. FDM (frequency division multiplexing) means that DMRSs for at least two layers are arranged on different frequency resources (e.g., subcarriers), respectively. CDM (code division multiplexing) means that DMRSs for at least two layers arranged on the same radio resource are multiplexed together using orthogonal sequence (or, orthogonal covering). Particularly, orthogonal cover code used in applying CDM multiplexing to RS resource elements on DMRS located OFDM symbols may be abbreviated OCC. For instance, Walsh code, DFT (discrete Fourier transform) matrix or the like may be used as OCC.

The DMRS pattern shown in FIG. 7 indicates a mixed form of CDM and FDM. For instance, CDM group 1 may be mapped to ports 7, 8 11 and 12 and CDM group 2 may be mapped to ports 9, 10, 13 and 14. The number of resource elements (Res) occupied by DMRS per channel rank varies depending on such a mapping relation. In case of the 'CDM+FDM' scheme, REs of 12 REs/RB/port may be used at the rank 1 or 2 [FIG. 8 (a)] and REs of 24 REs/RB/port may be used at the ranks 3 to 8 [FIG. 8 (b)]. Alternatively, a full CDM scheme may be taken into consideration as well as the CDM-FDM mixed scheme. DMRS pattern according to the full CDM scheme is identical to that shown in FIG. 7. Yet, in case of port mapping, CDM group 1 may be mapped to ports 7, 8, 9 and 10 and CDM group 2 may be mapped to ports 11, 12, 13 and 14. Hence, REs of REs/RB/port may be used at ranks 1 to 4 and REs of REs/RB/port may be used at ranks 5 to 8, by which the present example may be non-limited. And, an appropriate DMRS pattern may be usable in accordance with a transmission rank.

In the above two kinds of schemes, the number of Res occupied by DMRS may change in accordance with a rank. The case of 24 Res/RB/port has overhead (or the number of DMRS assigned REs) twice greater than that of the case of a low rank.

Meanwhile, in order to support spectral efficiency higher than that of the legacy 3GPP LTE system, LTE-A system can have an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the legacy antenna configuration and to design a new reference signal pattern for an additional antenna configuration. In this case, if CRS for a new antenna port is added to a system having a legacy antenna configuration, a reference signal overhead rapidly increases to lower a data transmission rate. In consideration of this matter, an ongoing discussion on designing a new reference signal (CSI-RS) for a channel state information (CSI) measurement for the new antenna port is made. Since CSI-RS is not the signal transmittable in all subframes, FIG. 7 or FIG. 8 does not show CSI-RS pattern for clarity.

Cooperative Multi-Pont (CoMP)

In accordance with an improved system performance requirement of 3GPP LTE-A system, CoMP transmission/reception scheme (represented as one of co-MIMO (collaborative MIMO), network MIMO, etc.) has been proposed. CoMP may raise performance of a user equipment located at a cell edge and may raise average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple manual scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

The CoMP schemes applicable to a DL case may be mainly classified into joint processing (JP) scheme and coordinated scheduling/coordinated beamforming (CS/CB) scheme.

The JP scheme can use data at each point (e.g., base station) of CoMP cooperation unit. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal may be improved and interference on another user equipment may be actively eliminated.

The dynamic cell selection scheme may mean the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point of transmitting data to the corresponding user equipment may be dynamically selected.

According to the CS/CB scheme, CoMP cooperation units may be able to cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Sounding Reference Signal (SRS)

Sounding reference signal (SRS) is mainly used for a base station to perform a frequency-selective scheduling in UL by performing a channel quality measurement and is not associated with UL data and/or control information transmission, by which the sounding reference signal is non-limited. And, the SRS may be usable for the purpose of an improved power control or for the purpose of supporting various start-up functions of recently unscheduled user equipments. For example, the start-up functions may include an initial modulation and coding scheme (MCS), an initial power control for data transmission, a timing advance and frequency half-selective scheduling (e.g., a scheduling performed in a manner that a frequency resource is selectively allocated in a first slot of a subframe but that a frequency resource pseudo-randomly hops into another frequency in a second slot of the subframe), and the like.

The SRS may be usable for a DL channel quality measurement on the assumption that a radio channel is reciprocal between UL and DL. This assumption is particularly effective to a TDD (time division duplex) system in which a UL and a DL share the same frequency band with each other but are discriminated from each other in time domain.

A subframe, in which SRS is transmitted by a random user equipment within a cell, is indicated by cell-specific broadcast signaling. A 4-bit cell-specific parameter 'srsSubframeConfiguration' indicates 15 kinds of available configurations of a subframe for transmitting SRS within each radio frame. By this configuration, flexibility for adjusting an SRS overhead in accordance with a network arrangement scenario can be provided. A configuration of a remaining one ($16^{th}$) of the parameter is to completely switch off an SRS transmission within a cell and may be suitable for a cell that mainly serves fast user equipments for example.

Figure 9:
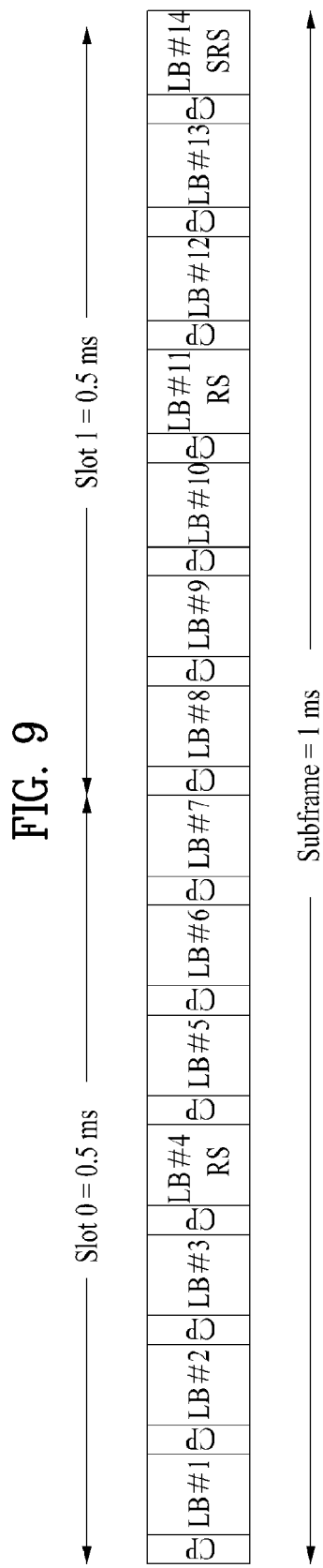
FIG. 9 is a diagram to describe a reference signal transmission in an uplink subframe.

Referring to FIG. 9, SRS is always transmitted on a last SC-FDMA symbol of a configured subframe. Hence, SRS and DMRS (demodulation reference signal) are located on different SC-FDMA symbols, respectively. PUSCH data transmission is not allowed to be performed on SC-FDMA symbol designated to SRS transmission. Hence, if a sounding overhead is highest (i.e., a case that an SRS transmission symbol exists in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be orthogonally identified by different cyclic shifts of the basic sequence assigned to a plurality of the user equipments, respectively. Although an SRS sequence of a different cell may be identifiable by assigning a different basic sequence to each cell, orthogonality between the different basic sequences are not guaranteed.

Relay Node

A relay node may be taken into consideration for an expansion of a fast data rate coverage, an enhancement of group mobility, a temporary network arrangement, an enhancement of a cell boundary throughput, and/or a network coverage offering to a new area. A relay node may include a fixed relay node located at a fixed place or a mobile relay node having a moving location.

Referring now to FIG. 1, the relay node 120 plays a role in forwarding transmission and reception between the base station 110 and the user equipment 131. And, two kinds of links (i.e., a backhaul link and an access link) differing from each other in attributes are applied to carrier frequency bands, respectively. The base station 100 may include a donor cell. And, the relay node 120 is connected by wireless to a wireless-access network via the donor cell 110.

In case that a backhaul link between the base station and the relay node 120 uses a DL frequency band or DL subframe resource, it may be represented as a backhaul downlink. In case that a backhaul link between the base station and the relay node 120 uses a UL frequency band or UL subframe resource, it may be represented as a backhaul uplink. In this case, the frequency band is a resource allocated in FDD (frequency division duplex) mode and the subframe is a resource allocated in TD (time division duplex) mode. Similarly, in case that an access link between the relay node 120 and the user equipment(s) 131 uses a DL frequency band or DL subframe resource, it may be represented as an access downlink. In case that an access link between the relay node 120 and the user equipment(s) 131 uses a UL frequency band or UL subframe resource, it may be represented as an access uplink. FIG. 1 shows the configurations of the backhaul UL/DL and access UL/DL of the FDD mode relay node.

A UL reception function and a DL transmission function are necessary for a base station and a UL transmission function and a DL reception function are necessary for a user equipment. On the other hand, a function of a backhaul UL transmission to a base station, a function of an access UL reception from a user equipment, a function of a backhaul DL reception from a base station and a function of an access DL transmission to a user equipment are necessary for a relay node.

Figure 10:
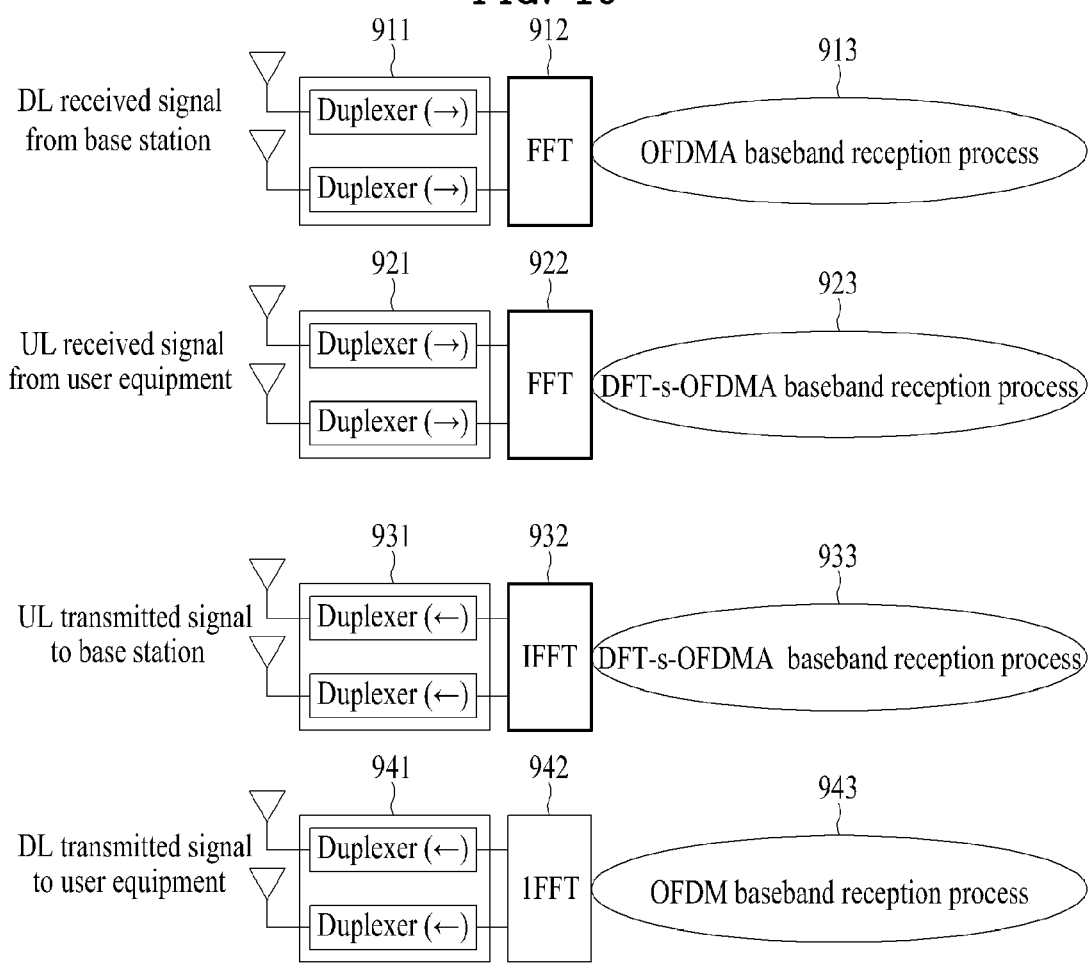
FIG. 10 is a diagram for one example of transceiving unit function implementation of FDD mode relay node.

FIG. 10 is a diagram for one example of transceiving unit function implementation of an FDD mode relay node. A reception function of a relay node is conceptionally explained as follows. First of all, a DL signal received from a base station is forwarded to an FTT (fast Fourier transform) module 912 via a duplexer 911 and an OFDMA baseband reception process 913 is then performed. A UL signal received from a user equipment is forwarded to an FFT module 922 via a duplexer 921 and a DFT-s-OFDMA (discrete Fourier transform-spread-OFDMA) baseband reception process 923 is then performed. The process for receiving a DL signal from a base station and the process for receiving a UL signal from a user equipment may be simultaneously performed in parallel with each other. On the other hand, a transmission function of the relay node is conceptionally explained as follows. First of all, a UL signal transmitted to a base station is transmitted via a DFT-s-OFDMA baseband transmission process 933, an IFFT (inverse FFT) module 932 and a duplexer 931. The process for transmitting the UL signal to the base station and the process for transmitting the DL signal to the user equipment may be simultaneously performed in parallel with each other. And, the duplexers shown in one direction may be implemented into a single bidirectional duplexer. For instance, the duplexer 911 and the duplexer 931 may be implemented into a single bidirectional duplexer. For another instance, the duplexer 921 and the duplexer 941 may be implemented into a single bidirectional duplexer. In particular, the bidirectional duplexer may be implemented in a manner that an IFFT module and baseband process module line associated with transmission/reception on a specific carrier frequency band diverges from a single bidirectional duplexer.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 (second layer) relay nodes, and type-2 relay nodes may belong to the category of the above-mentioned relay node.

Regarding a relay node configured to self-control a cell, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (third layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 (first layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not to be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay mode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground)].

Figure 11:
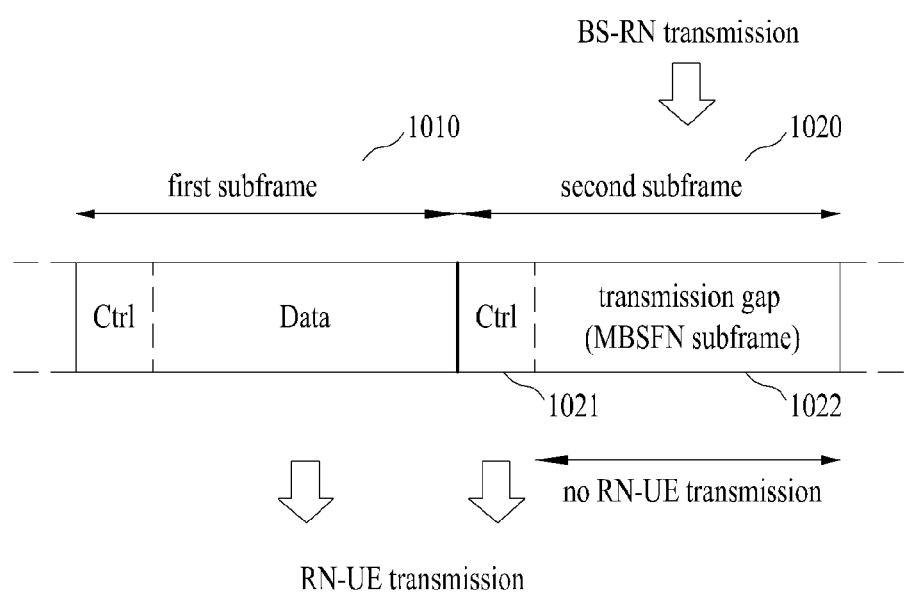
FIG. 11 is a diagram for one example of relay node resource partitioning.

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe [cf. FIG. 11]. Referring to FIG. 11, in a first subframe 1010 that is a normal subframe, a downlink (i.e., an access downlink) control signal and data are transmitted from a relay node to a user equipment. In a second subframe 1020 that is an MBSFN subframe, while a control signal is transmitted from the relay node to the user equipment on a control region 1021 of a downlink subframe but any transmission from the relay node to the user equipment is not performed in the rest region 1022 of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region 1021 of the second subframe, it may be able to provide backward compatibility with a legacy user equipment served by the relay node. While no signal is transmitted in the rest region 1022 of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe 1022, which uses the MBSFN subframe, shall be described in detail as follows. First of all, a control region 1021 of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval 1021, a relay node performs an access downlink transmission to a user equipment and may receive a backhaul downlink from a base station in the rest region 1022. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region 1022. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval 1022 except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PSDCH (Relay-PDSCH), respectively.

A relay node operating mode is described with reference to FIG. 12 and FIG. 13 as follows.

Figure 12:
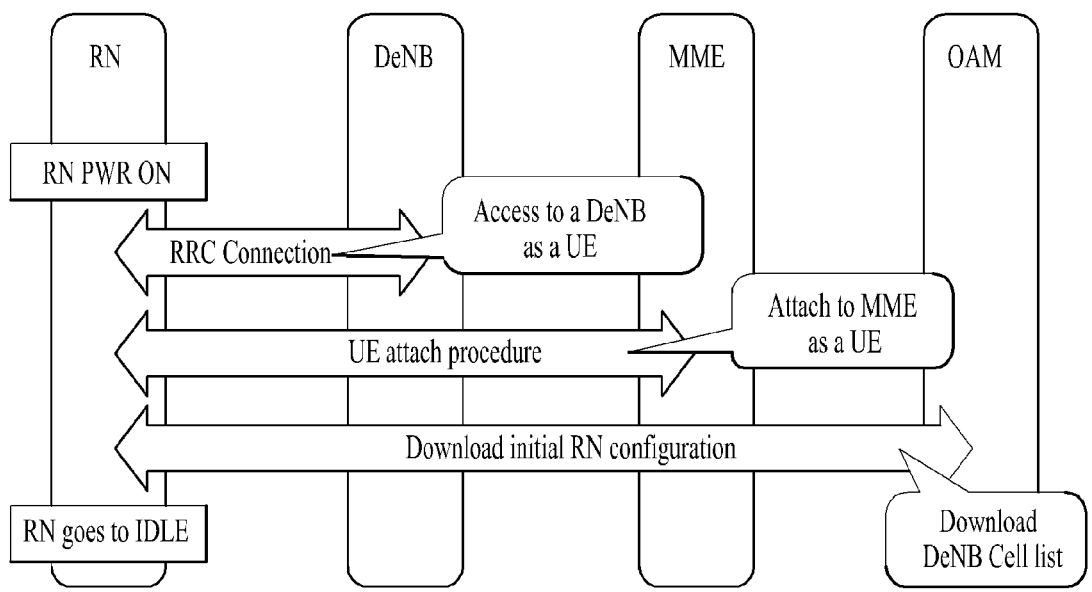
FIG. 12 is a diagram to describe one example of a UE mode operation of a relay node.
Figure 13:
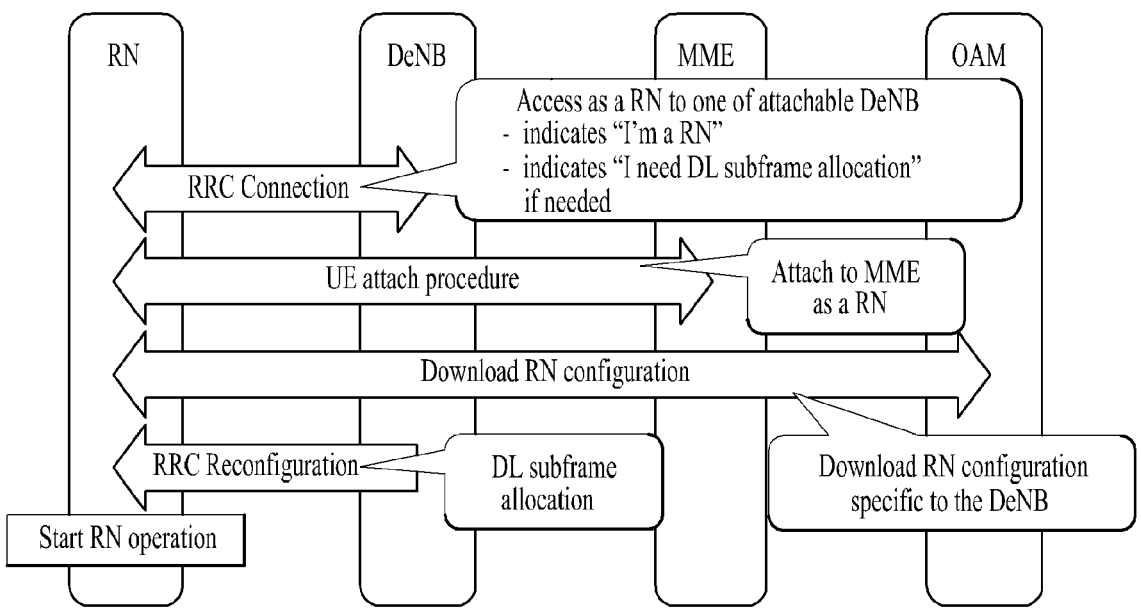
FIG. 13 is a diagram to describe one example of an RN mode operation of a relay node.

First of all, in FIG. 12 and FIG. 13, an RN indicates a relay node, a DeNB indicates a donor base station (donor eNB), an MME indicates a mobility management entity, and an OAM indicates an operation administration and maintenance entity. A relay node (RN) supportive wireless communication system supports that a relay node is connected by wireless to a base station (i.e., DeNB) configured to serve the relay node. The DeNB may include a function of passing communications between the RN and other network nodes (e.g., MME, etc.). The OAM may mean a set of network management functions that provide a network failure display, performance information, data and a diagnosis function.

FIG. 12 is a diagram to describe one example of a UE mode operation of a relay node. In the example shown in FIG. 12, a first step (or Phase I) in an RN startup process is illustrated. And, the Phase I may be called an attaching step for RN pre-configuration.

Referring to FIG. 12, if a power of an RN is turned on [power on], the RN accesses a DeNB by playing a role as a UE and enters an RRC_connected state. The RN is attached to an MME by playing a role as the UE and then performs a UE attachment process. The MME may perform a selection of a serving-gateway (S-GW) and a packet data network-gateway (PDN-GW or P-GW) for the RN as a normal UE. And, the RN can download an information (e.g., DeNB cell list, etc.) on an initial RN configuration from an OAM. In particular, through the process shown in FIG. 12, the RN is attached as the UE to the network in the course of the startup and then extracts initial configuration parameters from the RN OAM. After completion of the process shown in FIG. 12, the RN is detached as the UE from the network and a second step (or Phase II) shown in FIG. 13 may be triggered.

FIG. 13 is a diagram to describe one example of an RN mode operation of the relay node. In the example shown in FIG. 13, a second step (or Phase II) in the RN startup process is illustrated. And, the Phase II may be called an attaching step for an RN operation.

Referring to FIG. 13, the RN is connected to the DeNB selected from the DeNB cell list obtained in the Phase I and may then start up a relay node operation. In doing so, the RN accesses one DeNB by playing a role as a relay node and can indicate that it is the RN. If necessary, the RN may inform the selected DeNB that a DL subframe assignment is necessary. The RN is attached as the relay node to the MME. The RN can download RN configuration information specific to the selected DeNB from the OAM, whereby the RN configuration in the OAM can be completed. The DeNB provides RRC reconfiguration information to the RN and may then provide DL subframe assignment information. After completion of this process, The RN can start up the operation as a replay node.

Decoding Scheme of PDCCH Transmitted in Data Region

Although a legacy PDCCH is transmitted in a control region (cf. FIG. 4) of a DL subframe, a PDCCH (i.e., R-PDCCH) for a relay node is not transmittable in a legacy PDCCH region [cf. FIG. 11] but may be configured to be transmittable in a data region (e.g., the region 1022 shown in FIG. 11) of the DL subframe. Besides the R-PDCCH for the relay node, unlike the legacy PDCCH transmitted in the control region of the DL subframe, a new PDCCH (hereinafter named an extended-PDCCH (E-PDCCH) transmittable in the data region of the DL subframe may be newly defined. In the following description, a decoding scheme of PDCCH (e.g., R-PDCCH, E-PDCCH, etc.) transmittable in a data region of a DL subframe is explained. For clarity of the following description, a decoding scheme of R-PDCCH is explained exemplarily, by which the present invention may be non-limited. And, it is claimed that the principle of the present invention is applicable to a decoding scheme of PDCCH (e.g., E-PDCCH) transmittable in the data region of the DL subframe.

First of all, in order for a relay node to correctly decode R-PDCCH transmitted via an interface (e.g., Un interface) from a donor cell to the relay node, the relay node should be accurately aware of the number and locations (e.g., locations in time-frequency) of REs to which the R-PDCCH is mapped. In particular, in case that some REs in the R-PDCCH mapped region are used for another usage (e.g., RS transmission), a base station maps the R-PDCCH to the REs except the REs for the RS transmission and the RN should perform decoding on the REs to which the R-PDCCH is actually mapped.

Accordingly, in order for the relay node to correctly decode the R-PDCCH, pre-information on the number and locations of REs for another usage in a region, to which the R-PDCCH can be mapped, is necessary. Regarding this, in case that a DMRS transmission, in which the number and locations of REs used for a transmission vary depending on a transmission rank, is performed, it may be necessary to consider an influence on the decoding of the R-PDCCH.

As mentioned in the foregoing description with reference to FIG. 7 and FIG. 8, the DMRS overhead amounts to 12 or 24 REs in a resource block (RB) pair (e.g., in case of a normal CP, 1 subframe in time domain×12 subcarriers in frequency domain). For instance, if a transmission rank (i.e., the number of DMRS antenna ports) is equal to or smaller than 2, the DMRS overhead may be set to 12 REs/RB/subframe. If the transmission rank exceeds 2, the DMRS overhead may be set to 24 REs/RB/subframe. In aspect of a first slot to which R-PDCCH can be mapped, if the DMRS antenna port number is equal to or smaller than 2, the DMRS overhead may amount to 6 REs/RB/slot. If the DMRS antenna port number exceeds 2, the DMRS overhead may amount to 12 REs/RB/slot.

For example of a scheme for an RN to determine a DMRS overhead, a codebook subset restriction field defined by antenna information (AntennaInfo) IE among RRC information elements (IEs) is available. In particular, a DMRS overhead can be analogized/assumed from the codebook subset restriction field. In this case, the codebook subset restriction field is the information related to a process for a DL reception entity to determine/calculate such a channel state information (CSI) as a channel quality indicator (CQI), a precoding matrix indicator (PMI), a rank indicator (RI) and the like. And, the codebook subset restriction field corresponds to a higher layer signaling for indicating that the CSI is to be determined/calculated within a subset of a precoder codebook specified by a bitmap parameter of the codebook subset restriction field. Hence, the codebook subset restriction field is defined to become applicable only if a PMI/RI reporting is configured. In particular, the codebook subset restriction field has a meaningful information only if the PMI/RI reporting is configured.

For instance, the number of bits A, of a codebook subset restriction bitmap applicable to each transmission mode may be defined as Table 1.

TABLE 1

| | Number of bits $A_c$ | |
|---|---|---|
| | 2 antenna ports | 4 antenna ports |
| Transmission mode 3 | 2 | 4 |
| Transmission mode 4 | 6 | 64 |
| Transmission mode 5 | 4 | 16 |
| Transmission mode 6 | 4 | 16 |
| Transmission mode 8 | 6 | 32 |

For instance, when a size of a codebook subset restriction bitmap is 6 at the transmission mode 8, the antenna port number is 2. Hence, a DMRS overhead can be analogized as 6 REs in a first slot. For another instance, when a size of a codebook subset restriction bitmap is 32 at the transmission mode 8, the antenna port number is 4. Hence, a DMRS overhead can be analogized as 12 REs in a first slot.

Yet, if PMI/RI is not configured, a codebook subset restriction signaling is a meaningless information. Hence, it may happen a case that the RN is unable to analogize the DMRS overhead. Moreover, if CSI-RS is not configured, a codebook subset restriction does not exist at all. Hence, it may happen a case that the RN is unable to analogize the DMRS overhead. In particular, in an operation of analogizing a DMRS overhead by a conventional scheme, the RN may not be aware of the DMRS overhead in some cases. Thus, if the case that the RN is unable to know the DMRS overhead happens, the R-PDCCH decoding may not be correctly performed.

If the RN is not correctly ware of the number of REs to which the DMRS will be mapped, it may fail in decoding the R-PDCCH. For instance, a base station actually transmits DMRS in a first slot by mapping the DMRS to 12 REs and also transmits R-PDCCH by mapping the R-PDCCH to REs except the DMRS mapped REs. An RN is aware that the number of DMRS transmitted REs in the first slot is 6, determines the R-PDCCH mapped REs, and then performs R-PDCCH decoding. If so, it is unable to perform the decoding of the R-PDCCH correctly. Thus, if the RN is not accurately aware of the DMRS transmitted RE number, it is not able to specify the R-PDCCH mapped RE. Therefore, the R-PDCCH decoding cannot be performed correctly.

DMRS overhead may change depending on a transmission rank value. And, a transmission rank is associated with the number of transmitting antennas and/or the number of receiving antennas. Hence, in order for an RN to analogize/assume a DMRS overhead, it may be necessary to determine the number of transmitting antennas and/or the number of receiving antennas in advance. In the following description, the antenna number may mean the number of antenna ports. The antenna port is not a physical antenna but may mean a logically identifiable antenna. For instance, an identified reference signal is associated with each antenna port. A single antenna port may be implemented with a single physical antenna or a combination of a plurality of physical antennas. The number of antenna ports may be equal to or different from the number of physical antennas.

In the following description, various embodiments of the present invention capable of determining DMRS overhead accurately are explained.

Embodiment 1

The present embodiment relates to a method of determining a DMRS overhead by considering the number of transmitting antennas of a DeNB and the number of receiving antennas of an RN. In the present embodiment, assume that the RN is aware of the number of the transmitting antennas of the DeNB and the number of the receiving antennas of the RN.

In particular, in case that a smaller one of the number of the transmitting antennas of the DeNB and the number of the receiving antennas of the RN is equal to or smaller than N (e.g., N=2), it is able to define that the DMRS overhead is 6 REs/RB/slot. If the smaller one exceeds N, it is able to define that the DMRS overhead is 12 REs/RB/slot. Based on this rule, the DeNB can map and transmit R-PDCCH and the RN can perform decoding of the R-PDCCH correctly.

In order to operate by the present embodiment, the RN needs to know the information on the transmitting antennas of the DeNB in advance. This information can be acquired when the RN accesses the DeNB in the UE mode operation (Phase I) of the RN described with reference to FIG. 12. For instance, since a CRC masked bit value of PBCH has a value differing in accordance with the number of antenna ports, it is able to acquire the information on the transmitting antennas of the DeNB via the CRC masking of the PBCH. In addition, in order to make sure of the number of the transmitting antennas assumable from the CRC masking value of the PBCH, an additional information on the transmitting antennas of the DeNB can be provided via SIB. For instance, the RN can obtain the transmitting antenna number information of the DeNB by receiving SIB signal from the DeNB in UE mode.

Moreover, when the RN accesses the DeNB in the UE mode, the RN can deliver the number of its receiving antennas to the DeNB in a manner that the number of the receiving antennas of the RN is contained in one of RN capability parameters. Hence, the DeNB determines that the DMRS overhead amounts to one of 6 REs/RB/slot and 12 REs/RB/slot based on the number of the transmitting antennas of the DeNB and the RN's receiving antenna number delivered from the RN and is then able to perform mapping and transmission on R-PDCCH.

The RN assumes the DMRS overhead based on the DeNB's transmitting antenna number obtained from the DeNB and the number of the receiving antennas of the RN and is then able to perform R-PDCCH decoding correspondingly.

Embodiment 2

While an RN is operating in an RN mode (cf. FIG. 13), it is unable to know information on the number of antennas of a DeNB. In the RN mode, it is necessary for a subframe, in which the RN receives information from the DeNB, to be configured as an MBSFN subframe (cf. the second subframe 1020 shown in FIG. 11). In this case, subframes #0, subframe #4, subframe #5 and the like are restricted from being configured as MBSFN subframes. In doing so, since PBCH for carrying MIB is transmitted in the subframe #0, the RN is unable to receive the PBCH in the course of operating in the RN mode. Moreover, since SIB Type 1 is set to be transmitted in the subframe #5, the RN is unable to receive the SIB Type 1 in the course of operating in the RN mode. The MIB defines the information required for receiving additional system information and the SIB Type 1 defines scheduling of other system information blocks. Hence, in the course of operating in the RN mode, the RN is unable to receive other SIB Types as well as the MIB and the SIM Type 1. Accordingly, in the course of operating in the RN mode, the RN is unable to receive SIBs from the DeNB and is also unable to obtain the DeNB's transmitting antenna number contained in the SIB.

Therefore, in case that the antenna number changes in the course of operating in the RN mode, the RN can obtain the changed antenna information only if switching to the UE mode again. After obtaining the changed antenna information in the UE mode, the RN reenters the RN mode, assumes the DMRS overhead based on the obtained antenna information, and may then perform an R-PDCCH decoding operation based on the assumed DMRS overhead.

In case that the RN operates in the RN mode and then enters the UE mode, a service for UEs (i.e., R-UEs) attached to a cell of the RN is temporarily held or should be cancelled. After the RN has returned to the RN mode, the R-UEs need to be attached back to the RN or should perform a new cell search and the like. Therefore, overall performance of a network may be lowered.

According to the proposal made by the present invention, SIB containing the number of transmitting antennas of a DeNB is delivered not via PDSCH but via RN-specific higher layer signaling. In particular, if the SIB containing information on the number of transmitting antennas of the DeNB can be transmitted to an RN on the course of operating in RN mode by higher layer signaling (e.g., RRC signaling), it is able to prevent a problem from being caused by switching a mode of the RN to a UE mode. To this end, it is able to define and use a new RRC signaling for SIB delivery. Alternatively, it is able to newly add/define some fields in the previously defined RRC signaling. Alternatively, it is able to consider a method of reusing some fields in the previously defined RRC signaling for the usage of delivering the information on the number of the transmitting antennas of the DeNB.

Embodiment 2-1

As mentioned in the foregoing description of the embodiment 2, one example of a method of transmitting an SIB signal RN-specifically is described as follows. First of all, since an RN operating in RN mode is unable to receive PBCH and SIB, it is able to consider a method of transmitting information for analogizing/assuming an antenna information of a base station (e.g., DeNB) or a DMRS overhead through an RRC signaling receivable by the RN operating in the RN mode.

For instance, only PBCH information can be transmitted through an RN-specific signal. For another instance, only SIB information containing antenna information of DeNB can be transmitted through an RN-specific signal. For further instance, both PBCH and SIB information containing antenna information of DeNB can be transmitted together through an RN-specific signal.

Since the RN operating in the RN mode does not need all the informations in the PBCH and the SIB, a new RN-specific SIB information configured with informations effective for the RN only is defined and this optimized RN-specific SIB information can be then transmitted to the RN through RRC signaling. Information for analogizing/assuming a DMRS overhead should be included in the information effective for the RN.

Embodiment 2-2

As mentioned in the foregoing description, if the PMI/RI reporting is not configured, although a codebook subset restriction (codebookSubsetRestriction) field exists, its content is meaningless. If a value of the codebookSubsetRestriction field is substituted with a meaningful content to use (i.e., if a value of the codebookSubsetRestriction field is clearly defined for each condition), it is able to use the content of the codebookSubsetRestriction field in determining a DMRS overhead in an RN despite that the PMI/RI reporting is not configured.

Moreover, as mentioned in the foregoing description, if the CSI-RS is not configured, a codebookSubsetRestriction signal does not exist at all. In this case, when antenna information of DeNB is obtained depending on the codebookSubsetRestriction signal only, if the CSI-RS is not configured, an RN is unable to obtain accurate information on a DMRS overhead and is also unable to decode R-PDCCH correctly.

Due to the above reasons, since the signaling of the previous codebookSubsetRestriction information is not enough for the RN to assume the DMRS overhead, the present invention proposes a method of complementing or reconfiguring the codebookSubsetRestriction signaling. The present embodiment proposes a method of defining a bit field available for a case that a codebookSubsetRestriction field is not applicable as well as for a case that the codebookSubsetRestriction field is applicable.

Table 2 shows one example of various bit fields included in a codebookSubsetRestriction field. In Table 2, the codebookSubsetRestriction-10 indicates that it is codebookSubsetRestriction applicable to Release-10. The n2TxAntenna indicates that the number of transmitting antennas is 2. The n4TxAntenna indicates that the number of transmitting antennas is 4. And, the n8TxAntenna indicates that the number of transmitting antennas is 8. The tm means a transmission mode. For instance, the n2TxAntenna-tm3 indicates a case that the transmitting antenna number is 2 and that the transmission mode is 3. In this case, a size of a bit string (BIT STRING) is given as 2 bits.

TABLE 2

| codebookSubsetRestriction-r10 | CHOICE { |
|---|---|
| n2TxAntenna-tm3 | BIT STRING (SIZE (2)). |
| n4TxAntenna-tm3 | BIT STRING (SIZE (4)). |
| n2TxAntenna-tm4 | BIT STRING (SIZE (6)). |
| n4TxAntenna-tm4 | BIT STRING (SIZE (64)). |
| n2TxAntenna-tm5 | BIT STRING (SIZE (4)). |
| n4TxAntenna-tm5 | BIT STRING (SIZE (16)). |
| n2TxAntenna-tm6 | BIT STRING (SIZE (4)). |
| n4TxAntenna-tm6 | BIT STRING (SIZE (16)). |
| n2TxAntenna-tm8-r9 | BIT STRING (SIZE (6)). |
| n4TxAntenna-tm8-r9 | BIT STRING (SIZE (32)). |

TABLE 2-continued

|  | n2TxAntenna-tm9-r10 | BIT STRING (SIZE (6)). |  |
|---|---|---|---|
|  | n4TxAntenna-tm9-r10 | BIT STRING (SIZE (64)). |  |
|  | n8TxAntenna-tm9-r10 | BIT STRING (SIZE (1)). | -- Size bit string FFS |
|  | ... |  |  |
| } | OPTIONAL. |  | -- Cond TMX |

For instance, some of various bit fields included in the codebookSubsetRestriction field are fixed to a default size, as shown in Table 2, and the bit field fixed to the default size can be used for the assumption of DMRS overhead of a relay node. This default bit field is applicable despite that PMI/RI reporting is not configured. Moreover, the default bit field can be always transmitted to an RN irrespective of CSI-RS configuration. Thus, if the default bit field is used, it is able to provide information for enabling the RN to clearly assume the DMRS overhead despite that the PMI/RI reporting or the CSI-RS is not configured.

In this case, one default bit field may be configured or a plurality of default bit fields may exist depending on a condition. In case that one bit field is configured, one field in the codebookSubsetRestriction field is set to the default bit field irrespective of the transmission mode or the number of transmitting antennas. And, it is able to design to analogize the DMRS overhead in a manner that a specific value is carried on this field. In case that a plurality of bit fields are configured, it is able to configure one default bit field for each transmission mode. For instance, if there exist bit fields having a plurality of sizes per the number of transmitting antennas for each transmission mode, one of the bit fields can be set to a default field. And, it is able to design to analogize the DMRS overhead in a manner that a specific value is carried on this field.

For instance, in case of the transmission mode 9 (tm9) in Table 2, sizes of the codebookSubsetRestriction field include 6 bits, 64 bits and 1 bit for 2Tx, 4Tx and 8Tx, respectively. In this case, referring to Table 3, the bit field of the 64-bit size corresponding to 4Tx can be set to the default bit field. Using this bit field, it is able to indicate the DMRS overhead to the RN.

TABLE 3

|  | n2TxAntenna-tm9-r10 | BIT STRING (SIZE (6)). |
|---|---|---|
| default: | n4TxAntenna-tm9-r10 | BIT STRING (SIZE (64)). |
|  | n8TxAntenna-tm9-r10 | BIT STRING (SIZE (1)). |

Besides the example shown in Table 3, it is able to set the detailed configurations of the bit field per transmission mode in various ways.

In the above-mentioned example, in case that the codebookSubsetRestriction field is not applicable (e.g., the case that the PMI/RI reporting or the CSI-RS is not configured), the signaling scheme of informing the RN of the DMRS overhead using a specific bit field of the codebookSubsetRestriction field is explained. Yet, even if the codebookSubsetRestriction field is applicable, the above-described default bit field is available.

For example, in case that the codebookSubsetRestriction field is applicable like the case that the PMI/RI reporting or the CSI-RS is configured, the RN is able to analogize the DMRS overhead through the 64-bit bit field (n4TxAntenna-tm9-r10) shown in Table 3.

Moreover, in order for the RN to use the codebookSubsetRestriction field in the manner mentioned in the foregoing description, a fake CSI-RS configuration may be performed for the RN. In this case, the fake CSI-RS configuration means that the RN is made to recognize as if a CSI-RS transmission is present despite that the CSI-RS transmission for the RN does not exist. In case that there is no CSI-RS configuration, a codebookSubsetRestriction signal does not exist at all. Hence, The RN is made to use the codebookSubsetRestriction field through the fake CSI-RS configuration. If there is the CSI-RS configuration, the codebookSubsetRestriction information is always transmitted to the RN. Hence, even if there is no CSI-RS configuration actually, it is able to perform the fake CSI-RS configuration for the purpose of the codebookSubsetRestriction information transmission for the RN.

Such a fake CSI-RS configuration can be provided as an RN-specific signaling form to the RN. In particular, the fake CSI-RS configuration in the present embodiment is performed for the purpose of the codebookSubsetRestriction information transmission for a specific RN, the CSI-RS configuration is not performed on all relay nodes and user equipments within a cell but the CSI-RS configuration (i.e., the fake CSI-RS configuration) is RN-specifically signaled to the corresponding RN only.

Therefore, the RN is able to appropriately use the CSI-RS configuration information (particularly, codebookSubsetRestriction information) for the DMRS overhead assumption and is also able to correctly perform R-PDCCH decoding in consideration of the number and locations of DMRS REs.

Embodiment 3

The present embodiment relates to a method of determining a DMRS overhead in consideration of the number of receiving antennas of an RN only.

For instance, if the number of receiving antennas of an RN is N (e.g., N=2), a DMRS overhead may be assumed as 6 REs/RB/slot. If the number of receiving antennas of an RN exceeds N (e.g., N=2), a DMRS overhead may be assumed as 12 REs/RB/slot. For another instance, if the number of receiving antenna ports of an RN is N (i.e., a case that the antenna port 7 and the antenna port 8 are used), a DMRS overhead may be assumed as 6 REs/RB/slot. If the number of receiving antenna ports of an RN is 4 (i.e., a case that the antenna ports 7, 8, 9 and 10 are used), a DMRS overhead may be assumed as 12 REs/RB/slot.

In case that the DMRS overhead is determined based on the number of the receiving antennas of the RN, in order for a DeNB to actually perform DMRS mapping/transmission in accordance with the determined DMRS overhead, it is necessary for the information on the RN's receiving antenna number to be reported to the DeNB.

Only if the RN is operating in a UE mode (cf. FIG. 11), the RN is able to inform the DeNB of the number of the receiving antennas. Yet, the frequency of switching to the UE mode for the operation (i.e., assuming the DMRS overhead based on the RN's receiving antenna number) according to the present embodiment 3 is lower than that of switching to a UE mode for the above-mentioned operation (i.e., determining the DMRS overhead based on a smaller one of the DeNB's transmitting antenna number and the RN's receiving antenna number) of the embodiment 1. In particular, according to the present embodiment 3, it is advantageous in determining the DMRS overhead by maintaining a low frequency of the mode switching of the RN.

In particular, in case that the RN assumes the DMRS overhead in accordance with the number of the receiving antennas of its own, the RN does not need to know the number of the transmitting antennas of the DeNB or a change of the transmitting antenna number. The number of the transmitting antennas of the DeNB is provided to the RN through SIB but the RN operating in RN mode is not able to receive SIB information. Hence, in the operation according to the aforementioned embodiment 1, it is mandatory for the RN to switch to the UE mode to check the number of the transmitting antennas of the DeNB. Yet, in the operation according to the present embodiment 3, since the RN assumes the DMRS overhead based on the number of its receiving antennas only despite operating in the RN mode, an operation of checking information on the number of the transmitting antennas of the DeNB is skipped. Yet, in case that the number of the receiving antennas of the RN is changed, it may be necessary for the RN to switch to the UE mode.

In brief, the DMRS overhead is assumed based on one parameter (e.g., the number of receiving antennas of RN) for which the switching to the UE mode is required, in the present embodiment 3, whereas the DMRS overhead is assumed based on 2 parameters (i.e., the number of transmitting antennas of the DeNB and the number of receiving antennas of the RN), for which the switching to the UE more is required, in the aforementioned embodiment 1. Hence, the frequency of switching to the UE mode in the operation of the present embodiment 3 is much lower than that in the operation of the embodiment 1.

Meanwhile, in case that the RN is able to obtain the number of transmitting antennas of the DeNB without switching to the UE mode, as proposed in the aforementioned embodiments 2, 2-1, 2-2 and the like, the RN can correctly decode R-PDCCH by assuming the DMRS overhead while minimizing the frequency of switching to the UE mode like the present embodiment 3.

Moreover, the present embodiment 3 may be defined as an operating mode that becomes a basis of the operation of the aforementioned embodiment 1. In particular, in an environment in which it is not easy to obtain the number of transmitting antennas of the DeNB, it is able to assume the DMRS overhead based on the number of receiving antennas of the RN. In case that the number of transmitting antennas of the DeNB can be obtained by switching to the UE mode or in the course of operating in the RN mode, it is able to assume the DMRS overhead based on a smaller one of the number of transmitting antennas of the DeNB and the number of receiving antennas of the RN by the aforementioned method according to the embodiment 1.

Embodiment 4

The present embodiment relates to a method of assuming a DMRS overhead as a predetermined value. For instance, the predetermined value may be set to 6 REs/RB/slot. On other words, the present embodiment may relate to a method of fixing the number of receiving antennas of the RN to the predetermined value. For instance, it is able to assume that antenna port 7 and antenna port 8 are used only.

In this case, since the DMRS overhead is assumed as 6 REs/RB/slot (or the number of receiving antennas of the RN is assumed as 2), transmissions up to maximum rank 2 transmission are possible. In particular, transmissions up to the maximum rank 2 transmission are possible in a second slot as well as in a first slot. In more particular, when a data transmission is performed in the second slot, multi-layer transmission over a rank 2 (e.g., 4-layer PDSCH transmission) is not supported. Hence, in order to perform the 4-layer PDSCH transmission, another PRB pair (i.e., a PRB pair to which a DMRS overhead corresponding to a predetermined value is not applied) should be used.

According to the present embodiment, since a DMRS overhead is determined depending on a predetermined value, it is advantageous in that assumption of the DMRS overhead is not based on any parameters. In particular, in order to obtain a transmitting antenna number information of a DeNB, it is not necessary to receive SIB or another signaling and it is not necessary for the DeNB to be informed of a receiving antenna information of an RN. Of course, the DeNB and the RN need to exchange information indicating what is a predetermined DMRS overhead value is in an initial access of the RN (i.e., a UE mode operation in case of a startup of the RN). Yet, since a DMRS overhead set to a fixed value is always used while the RN is operating in an RN mode later, the switching between the UE mode and the RN mode is minimized.

In the example mentioned in the foregoing description, the predetermined DMRS overhead value is set to 6 REs/RB/slot. The same principle mentioned in the above description can be applied to a case that the predetermined DMRS overhead value is set to 12 REs/RB/slot.

The present embodiment 4 may be defined as an operating mode becoming the basis of the aforementioned embodiments or an operating mode in case of a big problem between DeNB and RN. In particular, in an extraordinary situation that transmissions and receptions of parameters (the number of transmitting antennas of the DeNB and/or the number of receiving antennas of the RN) for the DMRS overhead assumption are difficult, a problem can be solved in a manner that an operation is performed on the assumption of a previously agreed specific DMRS overhead according to the present embodiment 4. Therefore, in case that the transmissions and receptions of parameters for the DMRS overhead assumption are possible, it is able to apply an appropriate one of the operations according to the embodiments 1 to 3 mentioned in the foregoing description if necessary.

Figure 14:
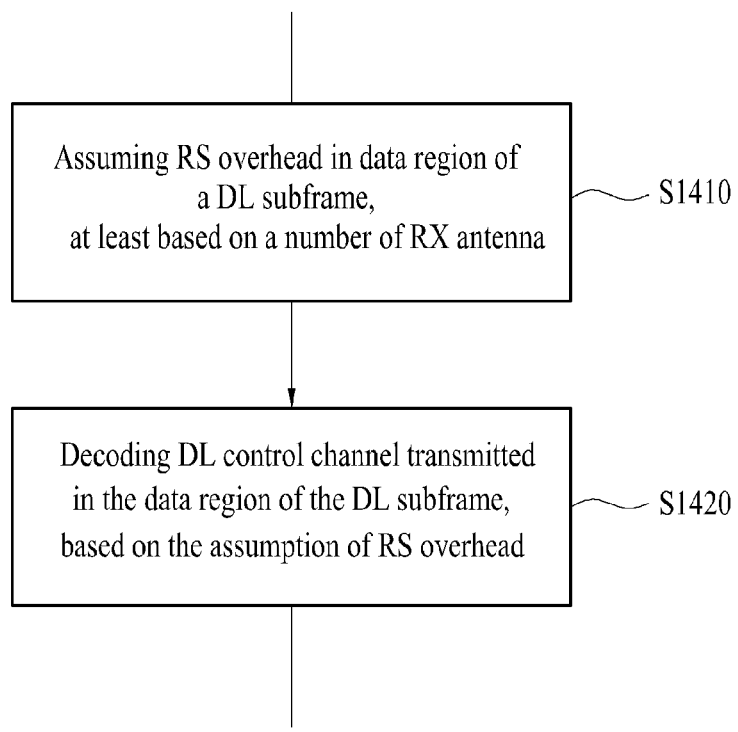
FIG. 14 is a flowchart to describe a downlink control channel receiving operation according to one embodiment of the present invention.

FIG. 14 is a flowchart to describe a downlink control channel receiving operation according to one embodiment of the present invention.

Referring to FIG. 14, a receiver is able to assume an overhead of a reference signal (e.g., DMRS) transmitted in a data region (cf. FIG. 4) of a DL subframe from a transmitter [S1410]. The assumption for the DMRS overhead can be determined at least based on the number of receiving antennas of the receiver. The meaning of 'at least based on ~' indicates that the assumption should be based on the number of the receiving antennas despite other parameters may be taken into consideration. For instance, the assumption for the DMRS overhead may be determined based on the number of transmitting antennas of the transmitter and the number of receiving antennas of the receiver.

In case that the DMRS overhead is determined based on the number of receiving antennas of the receiver only, for example, the DMRS overhead can be assumed as 6 REs/RB/slot if the receiving antenna number is equal to or smaller than 2. For another example, the DMRS overhead can be assumed as 12 REs/RB/slot if the receiving antenna number is greater than 2. The receiver can report its receiving antenna number to the transmitter in the course of operating in UE mode. Moreover, if the number of receiving antennas of the receiver is set to a predetermined value (e.g., 2), a predetermined value (e.g., 6 REs/RB/slot) may be applied to the corresponding DMRS overhead as well.

When the DMRS overhead is determined based on a smaller one of the number of transmitting antennas of the transmitter and the number of receiving antennas of the receiver, if the smaller one is equal to or smaller than 2, the DMRS overhead can be assumed as 6 REs/RB/slot. On the other hand, if the smaller one is greater than 2, the DMRS overhead can be assumed as 12 REs/RB/slot. Although the receiver is aware of the number of the receiving antennas of its own, the receiver should obtain information on the number of transmitting antennas of the transmitter from the transmitter. The information on the number of transmitting antennas of the transmitter may be obtained via SIB in the course of a UE mode operation of the receiver or via higher layer (e.g., RRC) signaling in the course of an RN mode operation of the receiver. The higher layer signaling may include a codebook-SubsetRestriction field. And, the number of the transmitting antennas can be analogized from the codebookSubsetRestriction field. It is able to design the codebookSubsetRestriction field to include a default bit field transmitted all the time. Alternatively, it is able to set the codebookSubsetRestriction field to be always transmitted to the receiver through a fake CSI-RS configuration.

Subsequently, the receiver can decode a downlink control channel (e.g., R-PDCCH, E-PDCCH, etc.) transmitted in the data region (cf. FIG. 4) of the downlink subframe from the transmitter based on the assumption of the above-mentioned reference signal (e.g., DMRS) overhead [S1420].

In the DL control channel transmitting and receiving operation described with reference to FIG. 14, the contents or items explained in the descriptions of the various embodiments of the present invention may be independently applicable or at least two embodiments of the present invention may be simultaneously applicable. And, redundant descriptions shall be omitted from the following description for clarity.

In the description with reference to FIG. 14, regarding the contents related to the decoding of R-PDCCH, the transmitter may include a donor base station and the receiver may include a relay node as a DL receiving entity. Yet, regarding the contents related to the decoding of E-PDCCH, the transmitter may include a base station and the receiver may include a user equipment. Alternatively, the transmitter may include a relay node as a DL transmitting entity and the receiver may include a user equipment.

Figure 15:
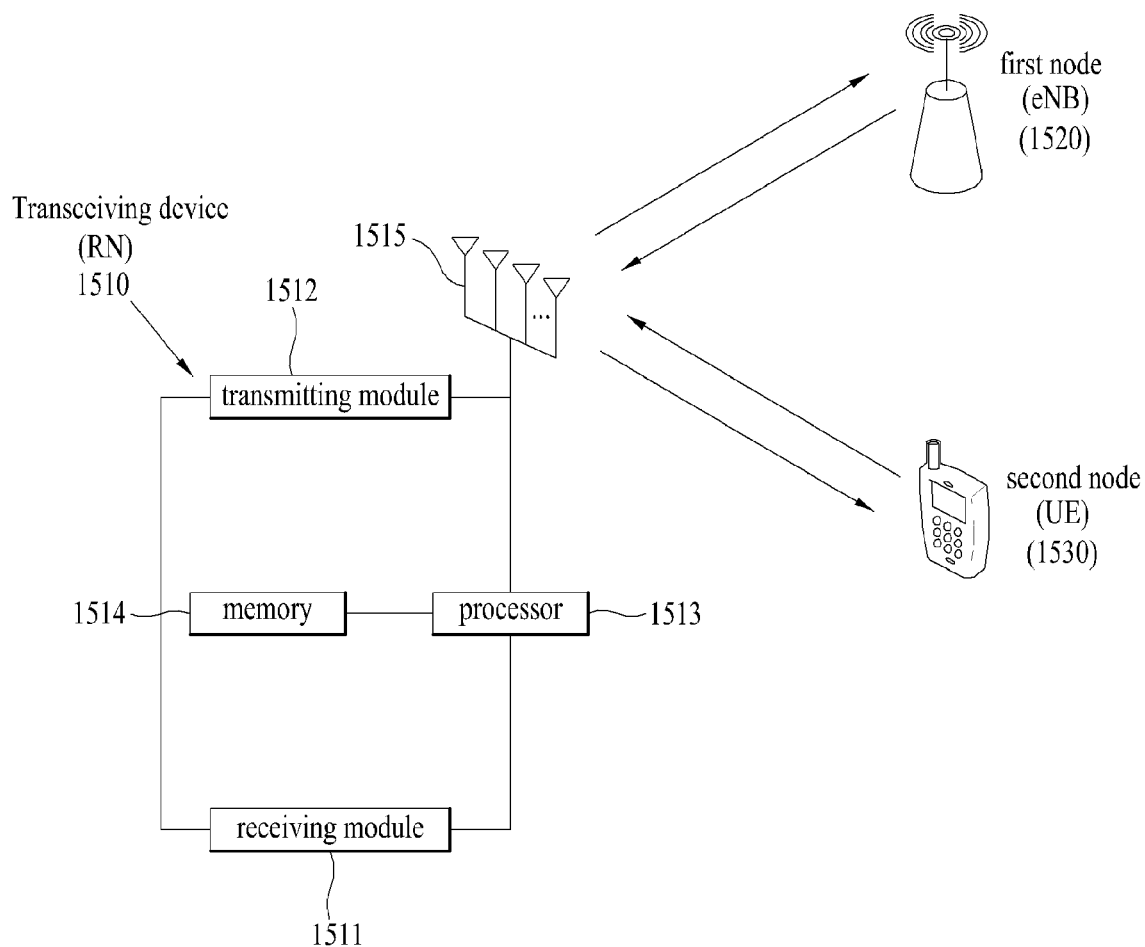
FIG. 15 is a diagram for a preferable configuration of a wireless communication system according to one embodiment of the present invention.

FIG. 15 is a diagram for a preferable configuration of a wireless communication system according to one embodiment of the present invention. Referring to FIG. 15, a transceiving device 1510 may be connected to a first node 1520 and a second node 1530 by wireless. A detailed configuration of the transceiving device 1510 is described in detail with reference to FIG. 15 as follows.

First of all, the transceiving device 1510 can transceive control information and/or data with the first node 1520 via a radio link (e.g., eNB-RN link, backhaul link, etc.). And, the transceiving device 1510 can transceive control information and/or data with the second node 1530 via a radio link (e.g., RN-UE link, access link, etc.).

The transceiving device 1510 may include a receiving module 1511, a transmitting module 1512, a processor 1513, a memory 1514 and a plurality of antennas 1515. And, the receiving module 1511 may be implemented with a first receiving module configured to receive a DL signal from the first node 1520 and a second receiving module configured to receive a UL signal from the second node 1530. In particular, the first receiving module and the second receiving module may be implemented into a single module or separate modules. The transmitting module 1512 may be implemented with a first transmitting module configured to transmit a UL signal to the first node 1520 and a second transmitting module configured to transmit a DL signal to the second node 1530. In particular, the first transmitting module and the second transmitting module may be implemented into a single module or separate modules. The processor 1513 can control overall operations of the transceiving device 1510. Particularly, the processor 1513 can control transmissions and receptions of various signals, data and information via the receiving module 1511 and the transmitting module 1512. A plurality of the antennas 1515 means a transceiving device that supports MIMO (multi input multi output) scheme.

The transceiving device 1510 according to one embodiment of the present invention may be configured to receive a DL control channel from the first node 1510. The processor 1513 of the transceiving device 1510 may be configured to assume an overhead of a reference signal transmitted in a data region of a DL subframe. Based on the assumption for the overhead of the reference signal, the processor 153 may be configured to decode the DL control channel transmitted in the data region by the transmitter. In this case, the assumption for the overhead of the reference signal may be determined based on the number of receiving antennas of the receiver at least.

In the configuration of the transceiving device described with reference to FIG. 15, the contents or items explained in the descriptions of the various embodiments of the present invention may be independently applicable or at least two embodiments of the present invention may be simultaneously applicable. And, redundant descriptions shall be omitted from the following description for clarity.

In the description with reference to FIG. 15, the transceiving device 1510 may include a relay node and the first node 1520 may include a donor eNB. Alternatively, the transceiving device 1510 may include a user equipment and the first node 1520 may include a base station (eNB).

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of receiving a downlink control channel, which is received from a transmitter by a receiver in a wireless communication system, comprising the steps of:
    assuming an overhead of a reference signal transmitted in a data region of a downlink subframe; and
    decoding the downlink control channel in the data region transmitted by the transmitter based on the assumption for the overhead of the reference signal,
    wherein the assumption for the overhead of the reference signal is determined at least based on a number of receiving antennas of the receiver.

2. The method of claim 1, wherein if the number of the receiving antennas of the receiver is equal to or smaller than N, the overhead of the reference signal is assumed as 6 REs/RB/slot (resource elements/resource block/slot) and wherein if the number of the receiving antennas of the receiver is greater than the N, the overhead of the reference signal is assumed as 12 REs/RB/slot.

3. The method of claim 1, wherein the assumption for the overhead of the reference signal is determined based on a smaller one of a number of transmitting antennas of the transmitter and the number of the receiving antennas of the receiver.

4. The method of claim 3, wherein if the smaller one of the number of the transmitting antennas of the transmitter and the number of the receiving antennas of the receiver is equal to or smaller than N, the overhead of the reference signal is assumed as 6 REs/RB/slot, and
    wherein if the smaller one of the number of the transmitting antennas of the transmitter and the number of the receiving antennas of the receiver is greater than the N, the overhead of the reference signal is assumed as 12 REs/RB/slot.

5. The method of claim 3, wherein the number of the transmitting antennas of the transmitter is obtained via a system information block (SIB) from the transmitter while the receiver is operating in a UE (user equipment) mode.

6. The method of claim 3, wherein information on the number of the transmitting antennas of the transmitter is obtained through higher layer signaling from the transmitter while the receiver is operating in an RN (relay node) mode.

7. The method of claim 6, wherein the higher layer signaling includes a codebookSubsetRestriction field and wherein the receiver obtains the information on the number of the transmitting antennas of the transmitter from the codebookSubsetRestriction field.

8. The method of claim 7, wherein a specific bit field among a plurality of bit fields defined in the codebookSubsetRestriction field is defined as a default bit field, wherein the receiver obtains the information on the number of the transmitting antennas of the transmitter from a bit value of the default bit field, and wherein the default bit field is included in the higher layer signaling irrespective of CSI-RS (channel state information-reference signal) configuration.

9. The method of claim 6, wherein a receiver-specific fake CSI-RS is configured for the receiver.

10. The method of claim 1, wherein the number of the receiving antennas of the receiver is assumed as a predetermined value.

11. The method of claim 10, wherein the predetermined value is 2 and wherein the reference signal overhead is assumed as 6 REs/RB/slot.

12. The method of claim 1, further comprising the step of reporting information on the number of the receiving antennas of the receiver to the transmitter during the receiver is operating in a UE (user equipment) mode.

13. The method of claim 1, wherein the reference signal comprises a demodulation reference signal (DMRS) and wherein the downlink control channel is R-PDCCH (relay-physical downlink control channel) or E-PDCCH (extended-physical downlink control channel).

14. The method of claim 1, wherein the receiver comprises a relay node (relay) and wherein the transmitter comprises a donor base station (donor eNodeB).

15. A downlink control channel receiver, which receives a downlink control channel from a transmitter in a wireless communication system, comprising:
    a receiving module configured to receive a downlink signal from the transmitter;
    a transmitting module configured to transmit an uplink signal to the transmitter; and
    a processor configured to control the receiver including the receiving module and the transmitting module, the processor assuming an overhead of a reference signal transmitted in a data region of a downlink subframe, the processor configured to decode the downlink control channel in the data region transmitted by the transmitter based on the assumption for the overhead of the reference signal,
    wherein the assumption for the overhead of the reference signal is determined at least based on a number of receiving antennas of the receiver.

* * * * *